United States Patent [19]
Terada et al.

[11] Patent Number: 5,223,086
[45] Date of Patent: Jun. 29, 1993

[54] METHOD OF PRODUCING AN ACCELERATION SENSOR OF A SEMICONDUCTOR

[75] Inventors: Masakazu Terada, Kariya; Minoru Nishida, Okazaki; Shinsuke Watanabe, Aichi, all of Japan

[73] Assignee: Nippondenso Co., Ltd., Kariya, Japan

[21] Appl. No.: 848,721

[22] Filed: Mar. 9, 1992

[30] Foreign Application Priority Data

Mar. 11, 1991 [JP] Japan .................................. 3-45217

[51] Int. Cl.$^5$ ...................... H01L 21/306; B44C 1/22
[52] U.S. Cl. .................. 156/651; 156/659.1; 156/662; 73/517 R
[58] Field of Search ................... 156/647, 651, 659.1, 156/662, 633, 639; 29/25.35, 621.1; 73/488, 496, 517 R, 517 AV, 517 A

[56] References Cited

U.S. PATENT DOCUMENTS

| | | | |
|---|---|---|---|
| 4,670,092 | 6/1987 | Motamedi | 156/643 |
| 4,776,924 | 10/1988 | Delapierre | 156/647 |
| 4,783,237 | 11/1988 | Aine et al. | 156/647 X |
| 4,981,552 | 1/1991 | Mikkor | 156/647 |

FOREIGN PATENT DOCUMENTS

| | | |
|---|---|---|
| 60-154575 | 8/1985 | Japan . |
| 62-60270 | 3/1987 | Japan . |
| 1-274478 | 11/1989 | Japan . |
| 1-302167 | 12/1989 | Japan . |
| 3-37749 | 6/1991 | Japan . |

Primary Examiner—William A. Powell
Attorney, Agent, or Firm—Cushman, Darby & Cushman

[57] ABSTRACT

This invention relates to a method of producing an acceleration sensor of a semiconductor. Piezo resistance layers are formed in a silicon tip 2 of a single crystal etched in an anisotropic etching liquid such as a KOH solution, etc., using as a mask a silicon nitride film. Then the silicon tip 2 of the single crystal is soaked in an isotropic etching liquid for a predetermined time and is etched to a depth of 0.5-2.0 μm. Further, a photoresist is applied over a whole surface thereof to form a slot extending to a hollow.

4 Claims, 6 Drawing Sheets

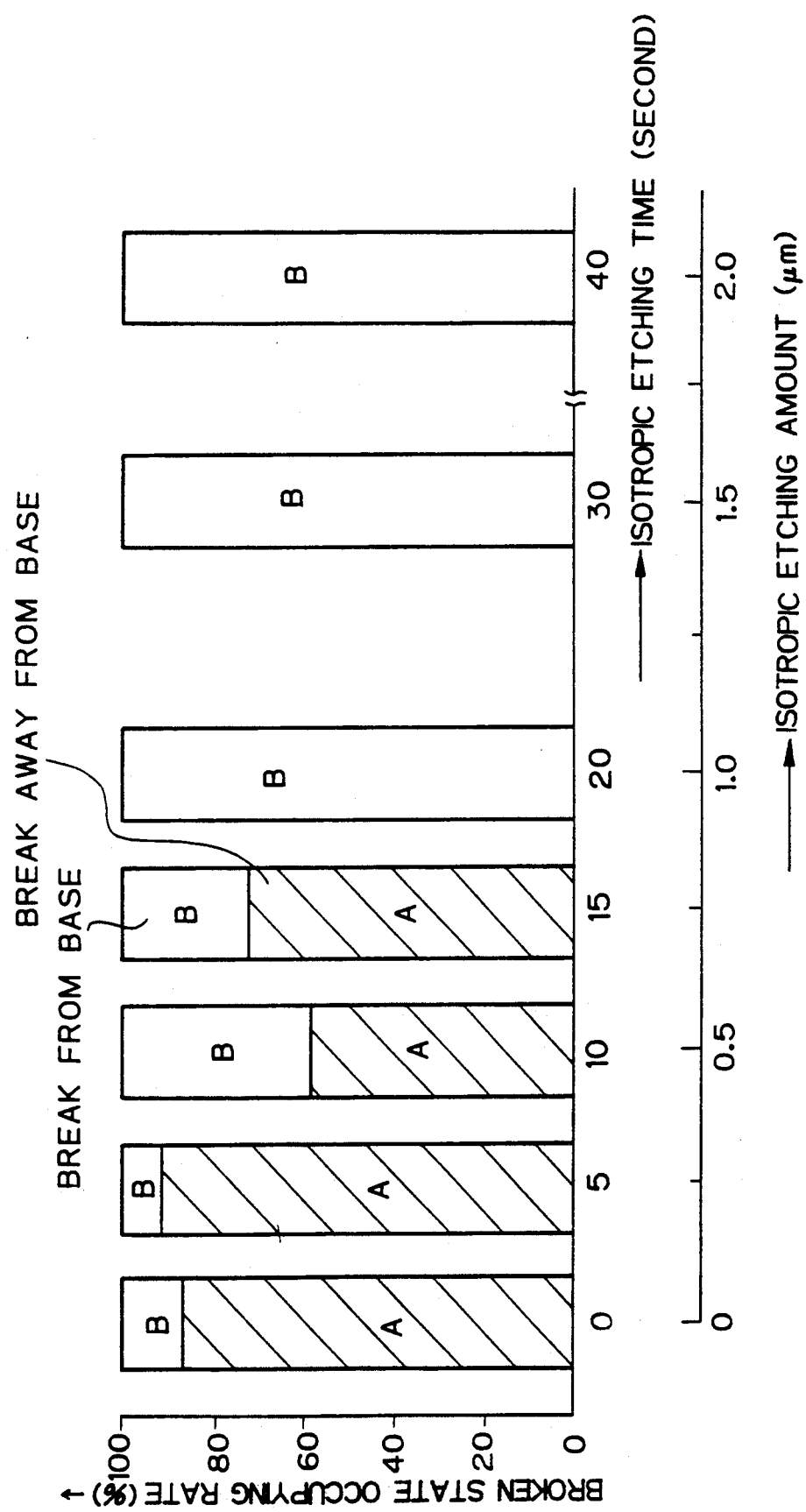

METHOD OF PRODUCING AN ACCELERATION SENSOR OF A SEMICONDUCTOR

BACKGROUND OF THE INVENTION

1. Field of the Invention

The present invention relates to a method of producing an acceleration sensor of a semiconductor.

2. Description of the Related Art

In a conventional acceleration sensor of a semiconductor, a silicon tip of a single crystal is provided with a thin beam having piezo resistance layers, and to form this beam, an anisotropic etching method using KOH, etc. is used, to provide a very high manufacturing accuracy.

Nevertheless, in the anisotropic etching method since a concentration of stress often occurs at an edge part of a beam base, a problem arises in that the strength thereof can not be guaranteed. Particularly, since in the acceleration sensor of a semiconductor for detecting a very small acceleration of less than 1 G it is necessary to thin the thickness of the beam as much as possible, to thus raise the sensitivity, the beam is very week and therefore, the yield is low.

SUMMARY OF THE INVENTION

A object of the present invention is to provide a method of producing a high sensitive acceleration sensor of a semiconductor in which the semiconductor tip has a high beam strength.

In one aspect of the present invention, an 0.5 μm-2.0 μm isotropic etching is performed on a semiconductor tip of a single crystal, after an anisotropic etching thereof, to form a portion of the semiconductor tip of the single crystal as a thin beam in which piezo resistance layers are formed.

As a result of performing a 0.5 μm-2.0 μm isotropic etching of a semiconductor tip of a single crystal, after performing an anisotropic etching, to form a portion of the semiconductor tip of the single crystal as a thin beam in which piezo resistance layers are formed, a edge portion of the beam base is rounded to thus alleviate a stress concentration thereof.

BRIEF DESCRIPTION OF THE DRAWINGS

FIG. 15 is a view showing a relationship between an etching amount and a broken state occupying rate.

DESCRIPTION OF THE PREFERRED EMBODIMENTS

The invention will be described with reference to specific embodiments thereof, and the accompanying drawings.

Figure 1:
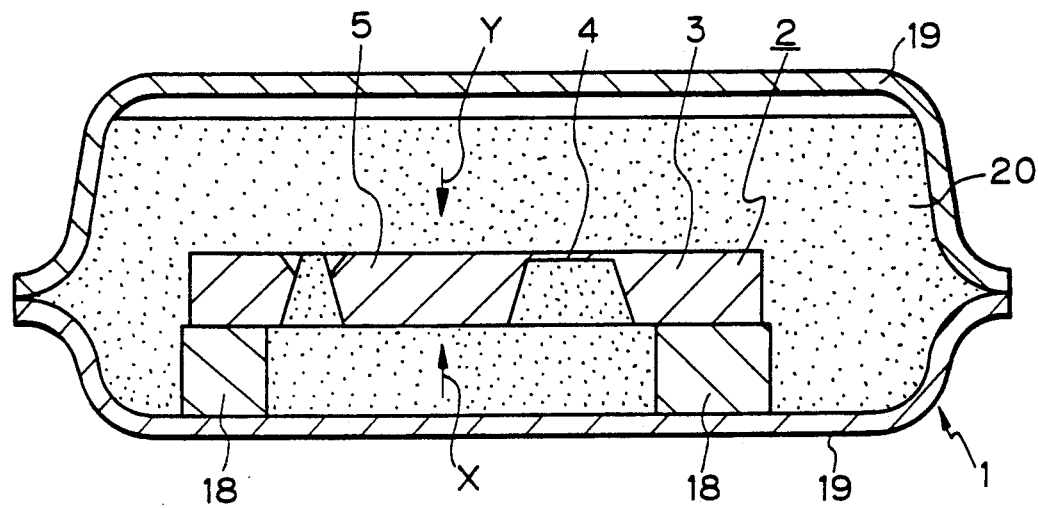
FIG. 1 is a view showing an acceleration sensor of a semiconductor packaged in a can.
Figure 2:
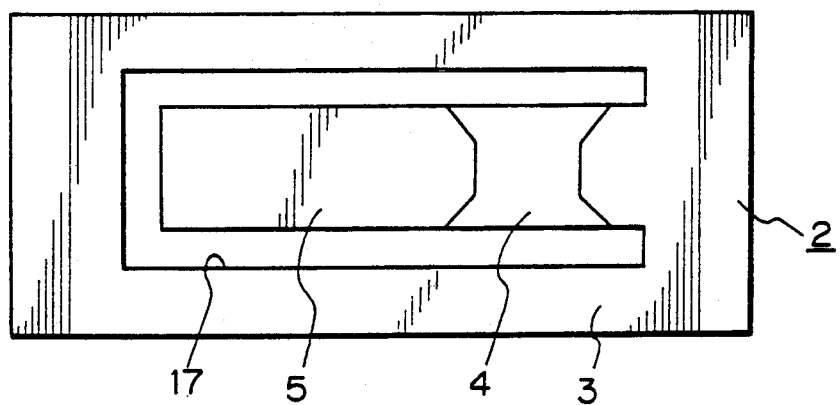
FIG. 2 is a view showing a lower surface of a silicon tip of an acceleration sensor of a semiconductor.
Figure 3:
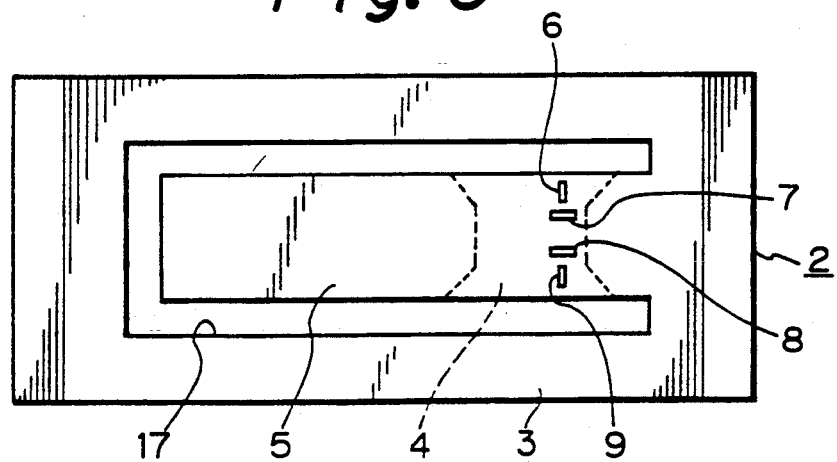
FIG. 3 is a plane view showing a silicon tip.

FIG. 1 shows an acceleration sensor 1 with a semiconductor packaged in a can, FIG. 2 is a lower surface view (seen in the x direction of FIG. 1) of a silicon tip 2 of a single crystal in the acceleration sensor 1 of the semiconductor, and FIG. 3 is a plane view (seen in the Y direction of FIG. 1) of the silicon tip 2 of the single crystal. This silicon tip 2 of the single crystal is formed in a cantilever structure, i.e., as a base 3 of a rectangle loop, a thin beam 4 is provided in the loop interior, and further, a thick layer 5 is provided at a extremity of the beam 4. Also the beam 4 is provided with four piezo resistance layers 6, 7, 8, 9, including a bridge circuit.

FIGS. 4 to 8 show a process of manufacturing the acceleration sensor of the semiconductor.

Figure 4:
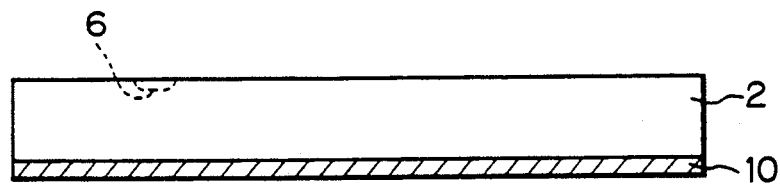
FIG. 4 is a view showing a manufacturing process.
Figure 5:
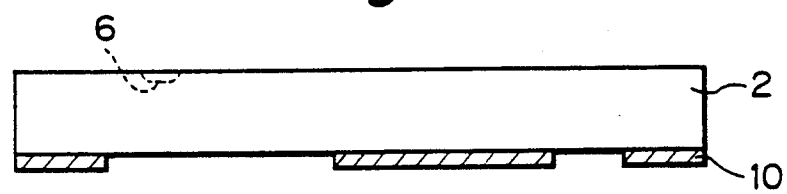
FIG. 5 is a view showing a manufacturing process.
Figure 6:
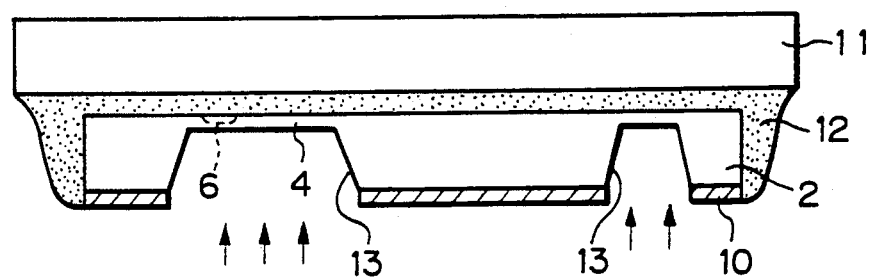
FIG. 6 is a view showing a manufacturing process.

First, as shown in FIG. 4, a plate-like silicon tip of the single crystal is prepared, and impurities are collected at a predetermined region of the upper surface thereof so that the four piezo resistance layers 6, 7, 8, 9 (See FIG. 3) are formed. Thereafter, a plasma.silicon nitride film 10 is formed over the whole surface of a lower part of the silicon tip of the single crystal, and further, as shown in FIG. 5, the silicon nitride film 10 is patterned by photo-etching to form the cantilever. Next, as shown in FIG. 6, a region of the silicon tip 2 of the single crystal that should not be etched is covered with a ceramic plate 11 and wax 12, the silicon nitride film 10 is used as a mask, and the silicon tip 2 of the single crystal is etched with an anisotropic etchant such as a KOH solution, etc. As a result the silicon tip of the single crystal is provided with a rectangle loop-like hollow 13, a portion of which becomes the thin beam 4.

Figure 7:
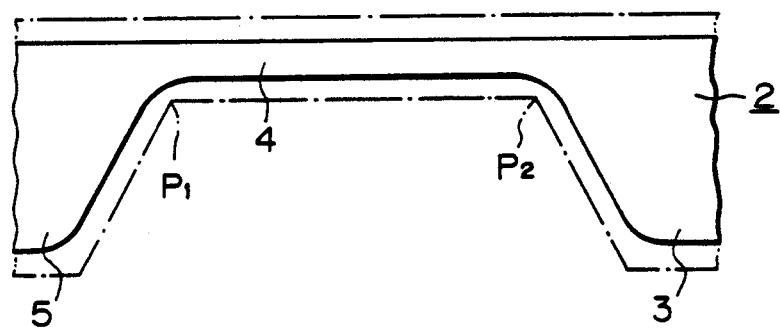
FIG. 7 is a view showing a manufacturing process.

When performing this anisotropic etching, as shown by a dashed line in FIG. 7, edges (shown by P1, P2 in FIG. 7) at the periphery of the beam 4 are sharp.

Next, after washing with water, the silicon tip 2 of the single crystal is soaked in the isotropic etchant for a predetermined time, and as shown by a solid line in FIG. 7, etched to a predetermined depth. In the present embodiment, an isotropic liquid such as a mixture of hydrofluoric acid, nitric acid and acetic acid is used. An adjustment of the depth of the isotropic etching is made by varying a soaking time thereof in the etchant. The depth of the isotropic etching is preferably 0.5 μm-2.0 μm. Thereafter the silicon tip 2 is washed with water.

Figure 8:
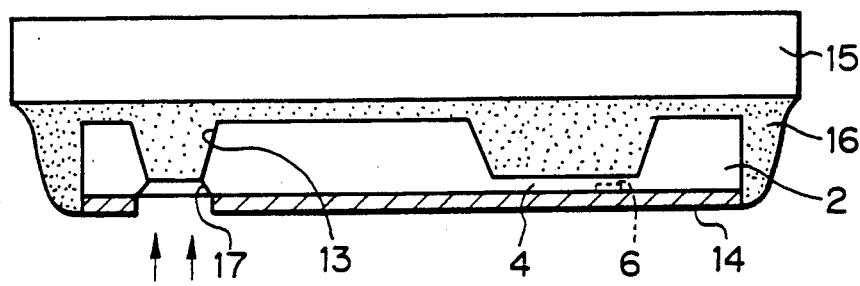
FIG. 8 is a view showing a manufacturing process.

Further, as shown in FIG. 8, a photoresist 14 is applied over a whole surface of the silicon tip 2 of the single crystal in such a manner that it is patterned by a photolithography to thus form the cantilever. A region that should not be etched is covered with a ceramic plate and wax 16, before performing the isotropic etching. As a result, a slot 17 extending to the hollow 13 in a region other than the beam in the silicon tip 2 of the single crystal is formed (see FIG. 3), and thus the cantilever is formed.

At this stage, the thickness of the beam 4 of the silicon tip 2 is several μm to several 10 μm, and the thickness of the base 3 and the layer 5 of the silicon tip 2 of the single crystal is several 100 μm. The silicon tip 2 of the single crystal is then placed on a washer 18, accommodated in the interior of a can 19, and soaked in silicone oil 20.

For measuring the acceleration, when the acceleration is applied to the acceleration sensor of the semiconductor, the beam 4 of the cantilever is displaced such that the base thereof becomes a supporting point whereby a distortion of the beam 4 occurs. Therefore, a bridge output based on a change of the piezo resistance value is obtained from the bridge circuit formed by the piezo resistance layers 6-9. Also, when the acceleration is applied, the silicone oil 20 inside the can 19 lowers the resonant frequency, which high frequency prevents the cantilever from breaking.

Figure 9:
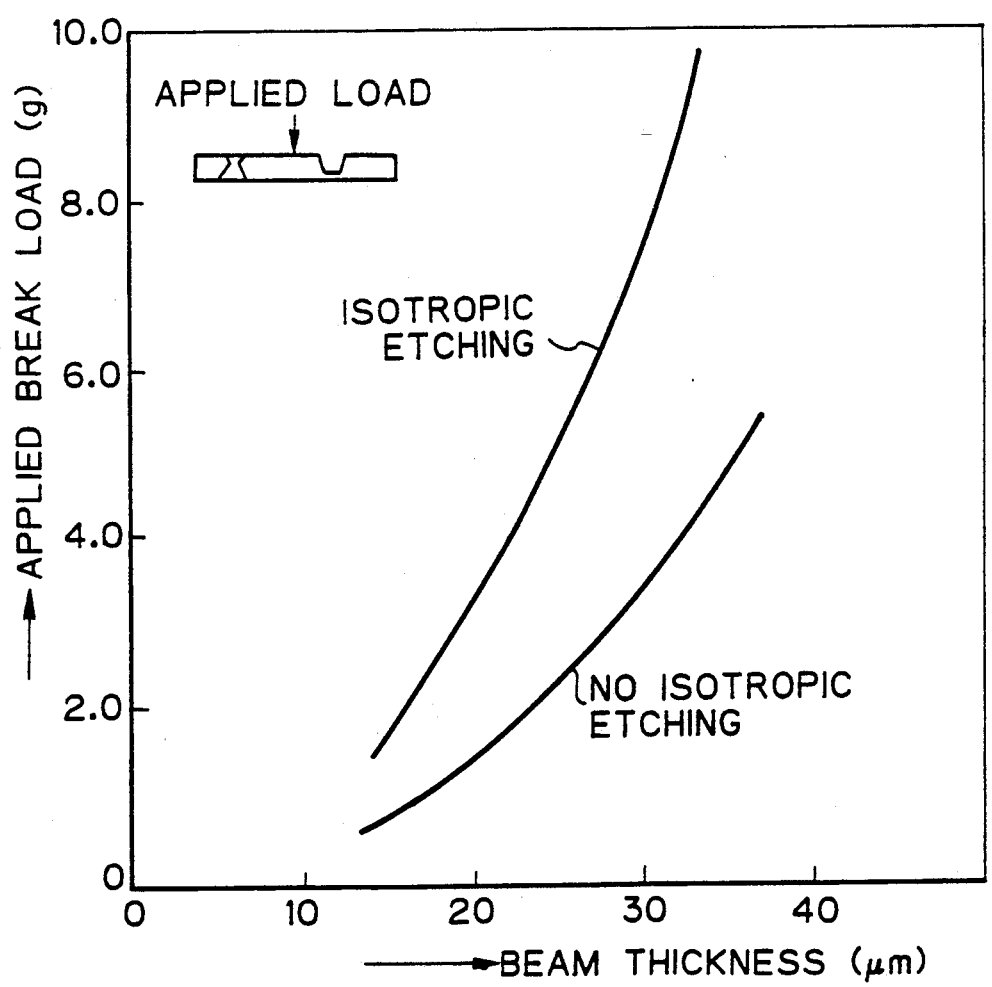
FIG. 9 is a view showing a relationship between a beam thickness and an applied break load.

In FIG. 9, a cantilever strength is shown by the relationship between the silicon tips 2 of the single crystal that is etched by 1 $\mu$m in the isotropic etching and not etched in the isotropic etching. From this figure, an improvement of the strength obtained by performing the isotropic etching is seen to be about twice as much as that when not performing the isotropic etching. Namely, as shown in FIG. 7, the edge P2 of the base of the beam 4 in the silicon tip 2 of the single crystal is rounded to thereby alleviate the stress concentration thereat.

Figure 10:
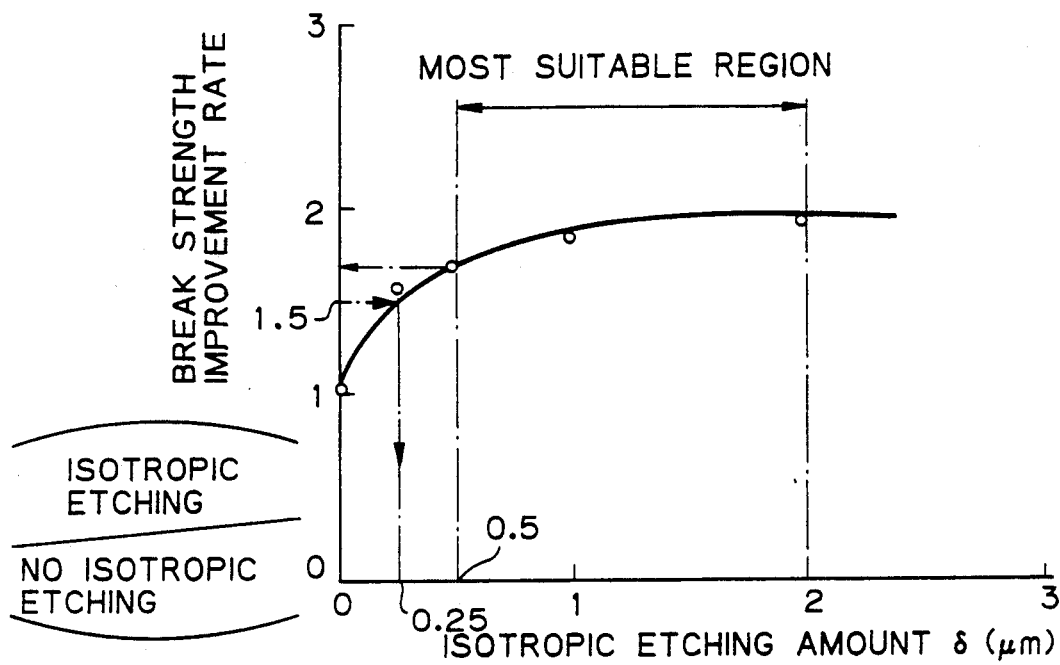
FIG. 10 is a view showing a relationship between an etching amount and a break strength increasing rate.
Figure 11:
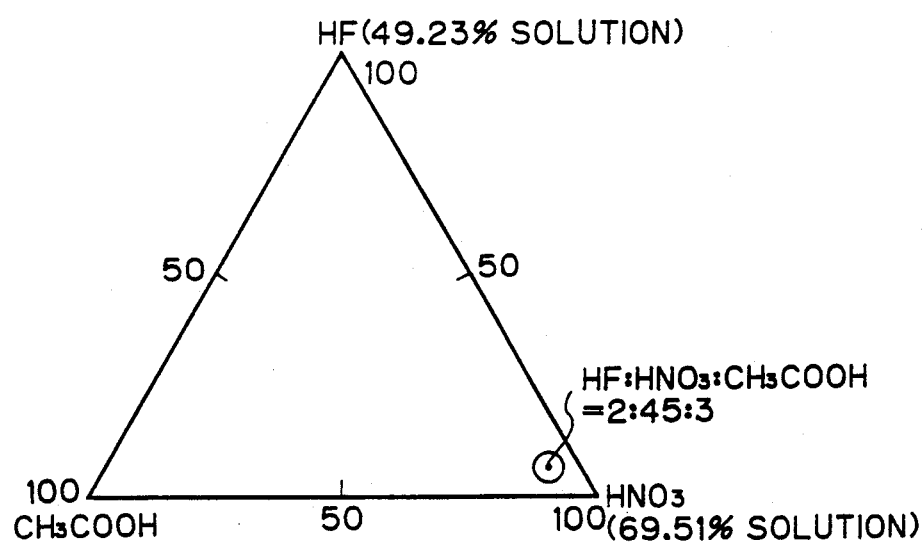
FIG. 11 is a view showing a composition of an isotropic etching liquid.

Further, FIG. 10 shows the results obtained by investigating a beam strength improving rate and a etching amount (depth) based on performing the isotropic etching. In this measurement, the isotropic etching liquid having the composition shown in FIG. 11 is used. Namely, in volume ratio, hydrofluoric acid:nitric acid-:acetic acid=2:45:3 is used. As seen from FIG. 10, for example, a 0.5 $\mu$m etching amount produces a 1.7 times improvement of the strength. Further, if the strength improvement rate is more than 1.5 times, since a poor rate inside a process (when working in a manufacturing process) may be about 0%, the etching amount may be more than 0.25 $\mu$m, but after considering the scattering during etching, it is found to need a more than 0.5 $\mu$m etching. Also, in the case of a more than 2 $\mu$m etching the strength improvement is substantially saturated, since the etching scattering deteriorates the accuracy of the thickness of the beam 4, and thus a limit of the etching amount is less than 2 $\mu$m. Namely, the most suitable amount of isotropic etching is 0.5-2.0 $\mu$m.

Figure 12:
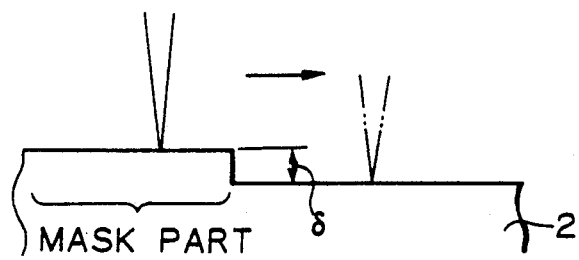
FIG. 12 is a view illustrating a method of measuring an etching amount.
Figure 13:
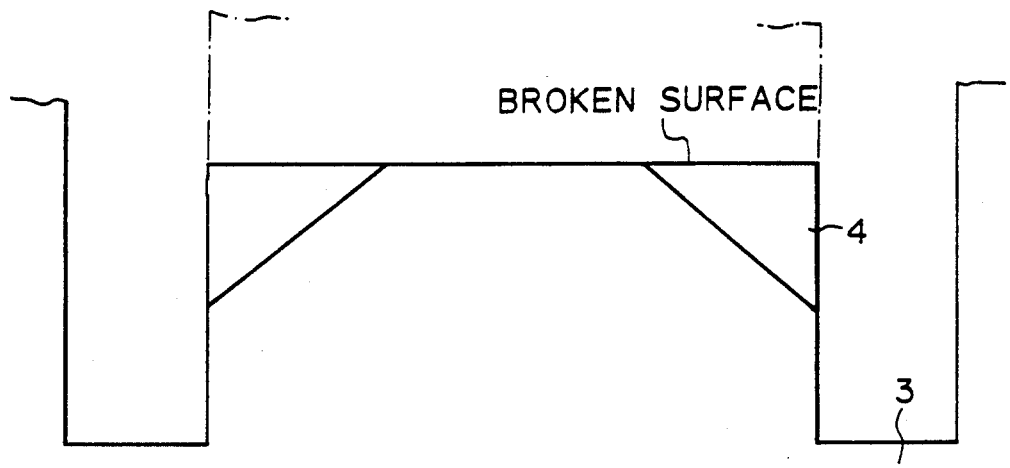
FIG. 13 is a sketch showing a state of a broken position.
Figure 14:
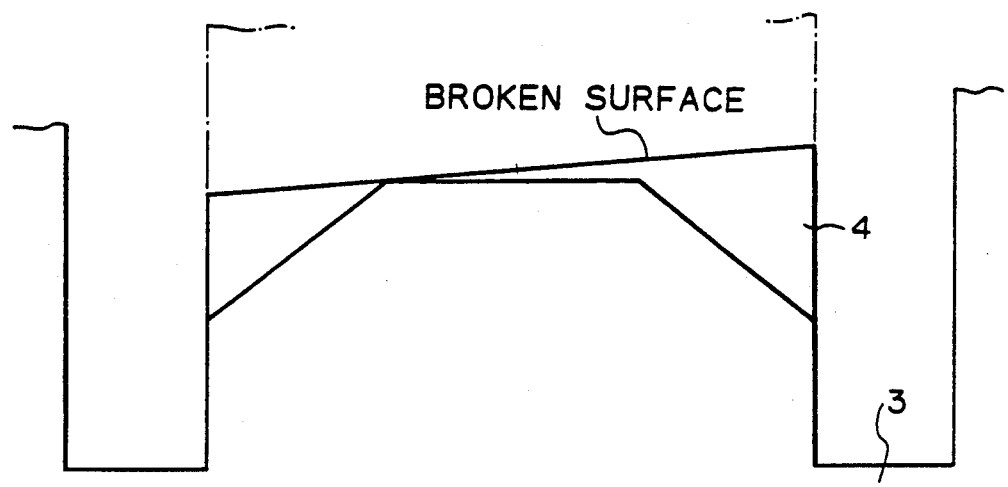
FIG. 14 is another sketch showing a state of a broken position.

Further, according to the measurement of the isotropic etching amount in FIG. 10, as shown in FIG. 12 the silicon tip 2 of the single crystal is prepared in a state such that a portion thereof is masked and the etching is performed under the same conditions as when manufacturing a sensor, and the step difference $\delta$ is measured by a step difference meter to thereby obtain the etching amount. Further, a state of a broken position in the silicon tip of the single crystal where this isotropic etching is not performed is shown in FIG. 13 and a state of a broken position in the silicon tip of the single crystal where this isotropic etching is performed is shown in FIG. 14. In the silicon tip where the isotropic etching is not performed, as shown in FIG. 13, the beam 4 is broken from the base, and in the silicon tip where the isotropic etching is performed, as shown in FIG. 14, the beam 4 is broken away from the base; namely, it was found that the break position is different. FIG. 15 shows the etching amount and a ratio of two kind of broken states (break at base, break away from base). As seen from FIG. 15, when an isotropic etching more than 1 $\mu$m is performed, the beam 4 is broken away from the base. Further, FIGS. 13 and 14 show sketches of the broken parts.

Therefore, according to the present embodiment, to form a portion of the silicon tip 2 of the single crystal as a thin beam 4 where the piezo resistance layers 6-9 are formed, after the anisotropic etching is performed, a 0.5 $\mu$m-2.0 $\mu$m isotropic etching of the silicon tip is performed and as a result, the edge part of the base in the beam 4 is rounded and the stress concentration thereof is alleviated, and thus it is possible to produce an acceleration sensor of a semiconductor with a beam 4 of the silicon tip 2 of the single crystal having a high strength and a high sensitivity. Namely, when the silicon tip of the single crystal is etched with the anisotropic etching liquid alone, the base of the beam is very easily broken. Especially, a sensor for detecting a very small acceleration of less than 1 G, is very weak, and therefore, the yield is low because the beam is thinned to about 20 $\mu$m thick. When the isotropic etching as in the present invention is performed, it is possible to improve the strength of the beam.

As set forth above, according to the present invention, a remarkable effect of producing an acceleration sensor of a semiconductor having a semiconductor tip with a high strength and a high sensitivity is obtained.

We claim:

1. A method of producing an acceleration sensor of a semiconductor, characterized by:
    performing a 0.5 $\mu$m-2.0 $\mu$m isotropic etching of a semiconductor tip of a single crystal after performing an anisotropic etching, to thereby form a portion of the semiconductor tip of the single crystal as a thin beam in which piezo resistance layers are formed.

2. A method of producing an acceleration sensor of a semiconductor according to claim 1, wherein a mixed liquid of hydrofluoric acid, nitric acid and acetic acid is used at a predetermined volume ratio as the isotropic etchant.

3. A method of producing an acceleration sensor of a semiconductor according to claim 1, wherein a depth of the isotropic etching is adjusted by varying a soaking time of the isotropic etching.

4. A method of producing an acceleration sensor of a semiconductor according to claim 1, wherein the semiconductor tip of the single crystal is accommodated in a can and soaked in a silicone oil.

* * * * *